United States Patent [19]
Matsuoka et al.

[11] Patent Number: 5,875,434
[45] Date of Patent: Feb. 23, 1999

[54] SYSTEM FOR PICKING ARTICLES

[75] Inventors: Kazuo Matsuoka; Naomichi Kawamura, both of Kawasaki, Japan

[73] Assignee: Fujitsu Limited, Kawasaki, Japan

[21] Appl. No.: 615,956

[22] Filed: Mar. 14, 1996

[30] Foreign Application Priority Data

Mar. 15, 1995 [JP] Japan .................................. 7-055934

[51] Int. Cl.$^6$ .............................. G06F 17/40; G06F 17/60
[52] U.S. Cl. ................ 705/28; 364/478.03; 364/478.04; 364/478.06; 364/478.09; 364/478.15; 364/478.17; 364/478.18; 395/228; 235/385; 414/281
[58] Field of Search ........................ 705/28; 364/478.01, 364/478.02, 478.03, 478.04, 478.06, 478.07, 478.08, 478.09, 478.15, 478.16, 478.17, 478.18; 395/228; 209/73, 3.3; 235/385, 472, 492; 414/217, 276, 281

[56] References Cited

U.S. PATENT DOCUMENTS

| | | | |
|---|---|---|---|
| 4,036,365 | 7/1977 | Rosenfeld | 209/73 |
| 4,991,719 | 2/1991 | Butcher et al. | 209/3.3 |
| 5,006,996 | 4/1991 | Nakamura et al. | 364/478 |
| 5,018,073 | 5/1991 | Goldberg | 364/478 |
| 5,025,140 | 6/1991 | Varley | 235/385 |
| 5,113,349 | 5/1992 | Nakamura et al. | 364/478 |
| 5,299,134 | 3/1994 | Speckhart et al. | 364/478 |
| 5,388,945 | 2/1995 | Garric et al. | 414/217 |
| 5,478,183 | 12/1995 | Savigny | 414/276 |
| 5,550,745 | 8/1996 | Wurz | 364/478.03 |
| 5,557,096 | 9/1996 | Watanabe et al. | 235/492 |
| 5,582,497 | 12/1996 | Noguchi | 414/281 |
| 5,640,002 | 6/1997 | Ruppert et al. | 235/472 |

FOREIGN PATENT DOCUMENTS

| | | |
|---|---|---|
| 0 284 466A1 | 9/1988 | European Pat. Off. . |
| 36 22 817 | 1/1987 | Germany . |
| 86 33 223 | 4/1987 | Germany . |
| 36 30 095 | 3/1988 | Germany . |
| 41 31 567 | 3/1993 | Germany . |

OTHER PUBLICATIONS

Patent Abstracts of Japan, vol. 015, No. 164, Apr. 24, 1991 & JPA–03 0322241 (Honda Motor Co. Ltd.) 13 Feb. 1991.

Search Report Sep. 19, 1996 Europe.

Toshiaki, H., "Order Picking Device," *Patent Abstracts of Japan*, vol. 13, No. 327 (M–854), Jul. 24, 1989 & JP–A–01 110403 (Kubota Ltd.), Apr. 27, 1989.

*Primary Examiner*—Kevin J. Teska
*Assistant Examiner*—Russell W. Frejd
*Attorney, Agent, or Firm*—Staas & Halsey

[57] ABSTRACT

A system for picking particular articles, by using a receiving box, out of many articles held on article shelves in order to handle articles at high speeds, highly efficiently and highly reliably in a physical distribution management system. The system includes a wireless response tag having a rewritable storage unit, a receiving box having a tag, a terminal equipment for writing/reading article data to and from the tag, a plurality of article shelves, an order-accepting unit, and a belt conveyer, wherein provision is made of a destination-of-picking read terminal at a position of the belt conveyer in from of the article shelves to read the data of an article to be picked from the tag, to indicate the quantity and a management number on the article shelf and to store the management number in the tag, and when the receiving box has moved close to the article shelves, the management number corresponding to the article to be picked is read out and is flashed so as to give an instruction that the article is to be taken off the shelf and put into the receiving box.

8 Claims, 17 Drawing Sheets

Fig.7

| RECORD NUMBER | ←————— 16 BYTES —————→ | | | |
|---|---|---|---|---|
| 0 | TERMINAL NUMBER (4 BYTES) | SHELF NUMBER (8 BYTES) | | — |
| 1 | HOST RECORDING DATE (4 BYTES) | TERMINAL RECEPTION DATE/HOUR (5 BYTES) | | |
| 2 | ARTICLE CODE (8 BYTES) | COLOR CODE (3 BYTES) | SIZE (2 BYTES) | — |
| 3 | ARTICLE CODE | COLOR CODE | SIZE | — |
| 4 | ARTICLE CODE | COLOR CODE | SIZE | — |
| ⋮ | ⋮ | ⋮ | ⋮ | ⋮ |
| M | TERMINAL NUMBER (4 BYTES) | SHELF NUMBER (8 BYTES) | | — |
| M+1 | HOST RECORDING DATE (4 BYTES) | TERMINAL RECEPTION DATE/HOUR (5 BYTES) | | |
| ⋮ | ⋮ | ⋮ | ⋮ | ⋮ |
| N-3 | ARTICLE CODE (8 BYTES) | COLOR CODE (3 BYTES) | SIZE (2 BYTES) | — |
| N-2 | ARTICLE CODE | COLOR CODE | SIZE | — |
| N-1 | ARTICLE CODE | COLOR CODE | SIZE | — |
| N | | | | — |

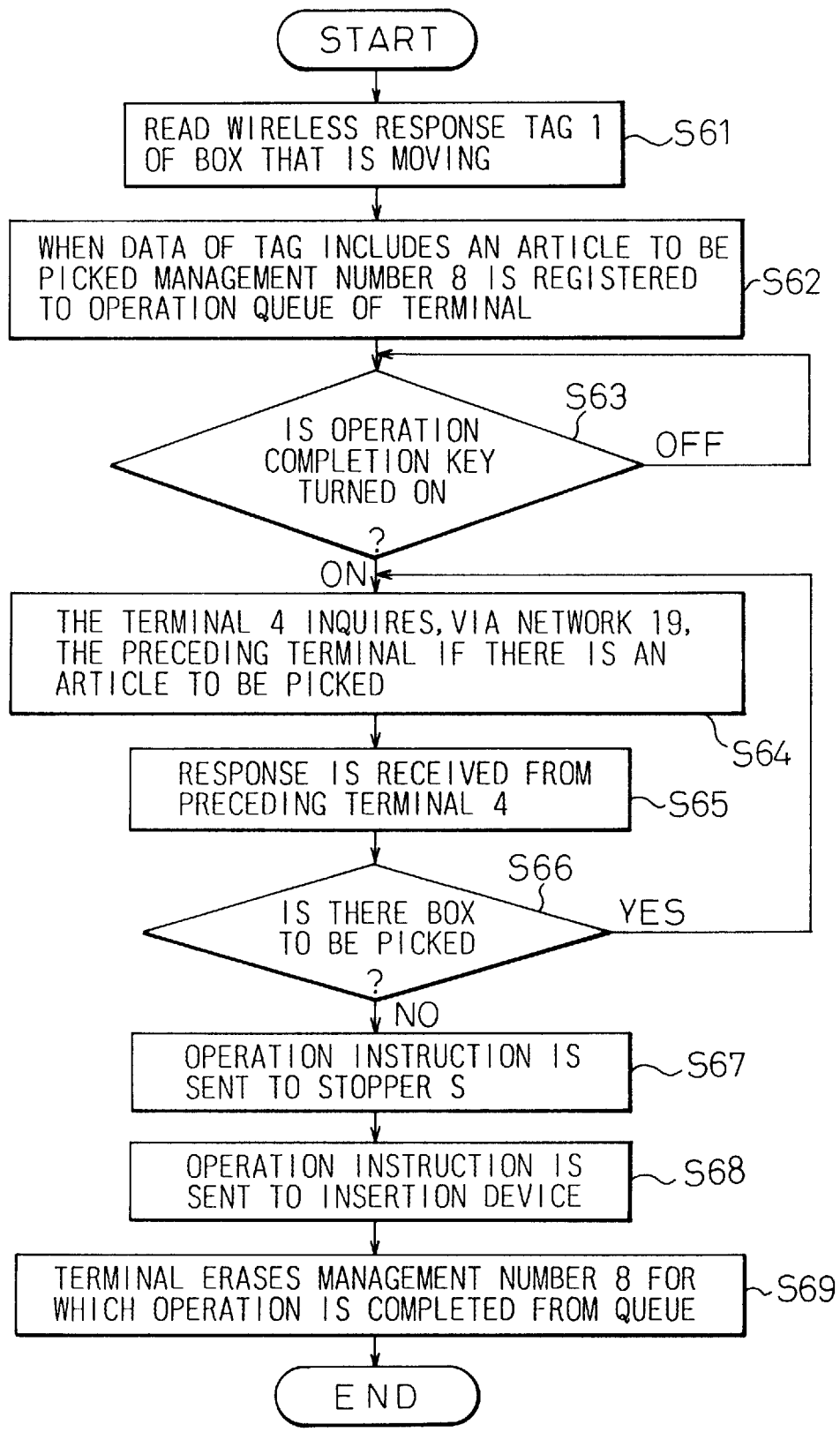

SYSTEM FOR PICKING ARTICLES

BACKGROUND OF THE INVENTION

1. Field of the Invention

The present invention relates to a system for picking desired articles at wholesale dealers and mail-order stores in order to send the articles to retail shops and individual persons.

Accompanying an increase in the frequency of delivering articles in small amounts from wholesale dealers to retail shops and an increase in the amount of articles handled by the mail-order stores, it has been desired to provide a system for picking articles, in physical distribution management, at a high speed while maintaining an improved efficiency and reliability.

2. Description of the Related Art

A conventional method of picking can be represented by an on-line physical distribution management system according to which bar codes on the articles are read out on a belt conveyer to sort them out using an interlocked host computer. According to this method, however, the amount of data to be recorded in the form of bar codes is as small as from 20 to 200 digits. In practice, therefore, ID numbers are attached to the bar codes, and detailed data are stored so that the host computer executes the processing in an on-line system. According to this method in which the host computer is relied upon for detailed data, when the data are further added accompanying a change in the layout for delivering articles or accompanying the addition of articles, the amount of communication relative to the host computer increases such that the access time is lengthened. As a result, the physical distribution management system fails.

According to another picking method, when the amount of picking is small, a worker takes up a picking list contained in a receiving box on the belt conveyer, puts a desired article into the receiving box, and checks off the item of the article on the picking list using a writing utensil to complete the picking processing. This method, however, involves the probability of various kinds of operational failures as the number of picking operations increases.

A further method consists of imparting an ID, in the form of a bar code, to the receiving box and reading the ID at a terminal at the article shelf to access to the host computer.

With this method, however, an increase in the amount of processing results in an increase in the access time to the host computer, making it difficult to carry out the processing in real time. Besides, the physical distribution management system is hindered if the host computer breaks down. According to the prior art as described above, a simple addition of an application or an increase in the number of workers no longer makes it possible to cope with an increase in the amount of processing.

SUMMARY OF THE INVENTION

The object of the present invention is to provide a system for picking articles which makes it possible to handle articles at high speed, highly efficiently and highly reliably, for physical distribution management, by eliminating the above-mentioned problems inherent in the prior art.

Concretely speaking, the present invention provides a system for picking articles at high speed and highly efficiently by providing a wireless response tag having a storage capacity larger than the conventional bar code for every receiving box, storing the data related to picking articles, data related to shipment and data related to missing articles in the wireless response tag, providing a plurality of destination-of-picking read terminals, effecting wireless communication to the wireless response tag of the receiving box on the belt conveyer, and moving the receiving box with the least waste of motion at the time of the picking operation.

According to the present invention, there is provided a system for picking articles comprising a wireless response tag having a rewritable storage unit, a receiving box having said wireless response tag for storing a desired article, an antenna for effecting communication to said wireless response tag, a terminal equipment for writing/reading article data to and from said wireless response tag via said antenna, a plurality of article shelves (S, T, U) for storing a variety of articles and display units disposed in the vicinities thereof, and a belt conveyer for conveying said receiving box to pick a particular article, by using said receiving box, out of many articles held on said article shelves, wherein provision is made of a destination-of-picking read terminal at a position of the belt conveyer in front of said article shelves to read the data of an article to be picked from said wireless response tag, to display the corresponding article and a picking management number on said display unit and to store said picking management number in said wireless response tag, and said terminal equipment reads the picking management number when said receiving box has moved close to the article shelves and displays it on said display unit by using said antenna disposed near said belt conveyer in the vicinities of said article shelves.

In the present invention, the picking management number is set to said destination-of-picking read terminal for each of said terminal equipment or for each group of said terminal equipment. In the present invention, the terminal equipment writes data related to missing articles into said wireless response tag.

The present invention further comprises shipment terminal equipment and a printer unit, wherein a customer and picking data are read out from the wireless response tag of the receiving box that has passed through the article shelf, and are printed onto a transport slip and a delivery slip.

In the present invention, furthermore, the terminal number and the data of the article on the article shelf are recorded into the wireless response tag, and the article data are set by using the wireless response tag when the terminal number is in agreement with said terminal equipment near the article shelf.

In the present invention, the belt conveyer is provided with a stopper for stopping the receiving box and, when the receiving box is to be automatically returned back to the belt conveyer by using an insertion device, absence of a receiving box at a preceding terminal equipment or at a plurality of preceding terminal equipment corresponding to the returning time is confirmed by said terminals, and an instruction signal is sent to said insertion device to return said receiving box back to said belt conveyer.

In the present invention having a plurality of terminals and lamps arranged along the belt conveyer, the preceding terminal indicates to the succeeding terminal a position at which the receiving box to be picked is moving by turning the lamp on.

BRIEF DESCRIPTION OF THE DRAWINGS

FIG. 7 is a diagram illustrating terminal setting management in the wireless response tag of the present invention;

FIG. 13 is a flow chart of when a receiving box is returned onto the belt conveyer in the conveyer system of FIG. 5.

DESCRIPTION OF THE PREFERRED EMBODIMENTS

Figure 1:
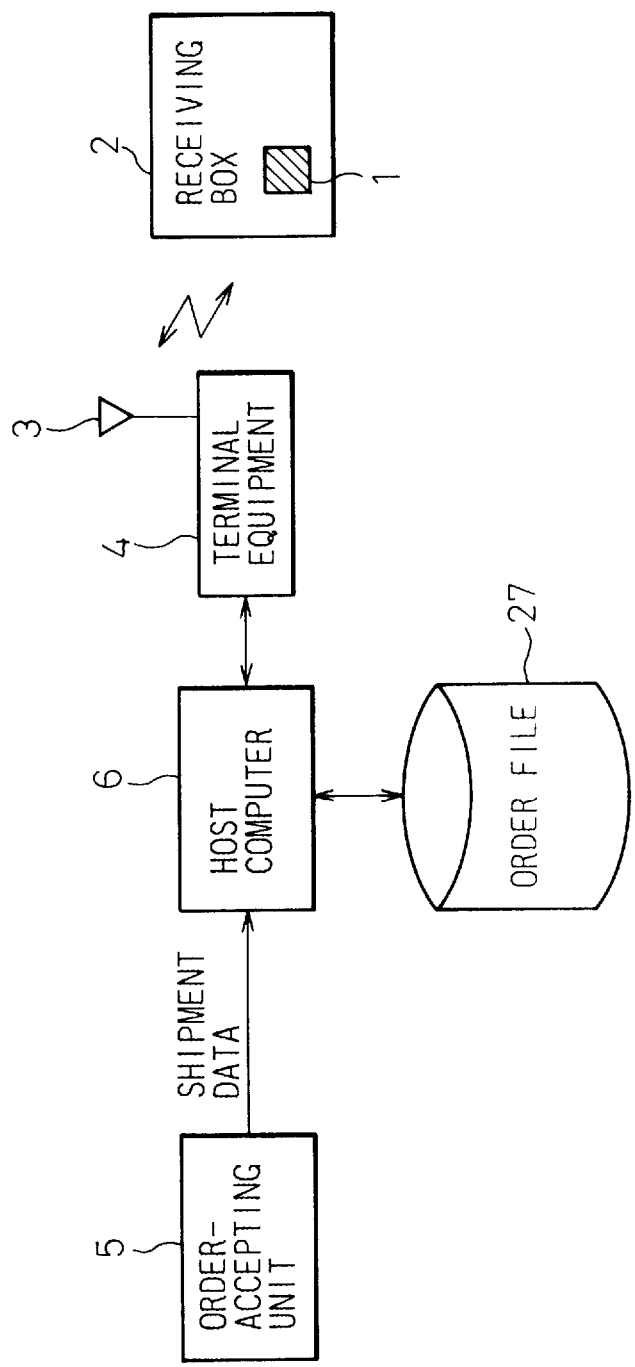
FIG. 1 is a diagram illustrating the constitution of a system for writing picking data into a tag according to the present invention.

Major points of the inventions of the claims will now be described.

A first embodiment of the present invention is designed to shorten the time in which a receiving box is moving on the belt conveyer. Generally speaking, when the data of a receiving box flowing on the belt conveyer are read and an article is picked, the receiving box stops for the period of time used by the worker for the picking operation and, as a result, the amount of work decreases per unit time.

According to the present invention, the data of an article to be picked are sent to a terminal equipment of a corresponding shelf from a position well ahead of the article shelf to provide a sufficient period of time for the worker to pick the article. The terminal equipment displays, on the shelf, the article data and a picking management number. The worker picks the article on the prepicking shelf and places it at a shelf position of the picking management number. When the corresponding receiving box moves close to the worker, the terminal equipment in front of the worker reads the picking management data stored in the wireless response tag via an antenna and turns on a lamp located close to the position of the corresponding receiving box. The worker draws the receiving box for which the lamp is turned on onto his own working plate, takes out the article relying upon the corresponding picking management number and puts the article into the receiving box. The above-mentioned step makes it possible to shorten the operation time. Recording the picking management number into the wireless tag as done in the present invention is very effective.

When the articles change depending upon the seasons and when a worker takes charge of a plurality of terminal equipment, it becomes likely that the same number may occur when the picking number is given to each of the terminals. In such a case, there may picking misses due to confusion of the worker. According to a second embodiment of the invention, the picking management number is imparted to a group of terminals that are handled by the worker.

According to a third embodiment of the invention, when the quantity of articles is smaller than a required quantity in picking the articles, the terminal equipment 4 near the worker who carries out the picking operation writes data related to the lack of articles into the wireless response tag 1, without the paper list that was previously used and without effecting the communication relative to the host computer as when bar codes are used. Therefore, the processing time is shortened and the articles and the data are brought into agreement.

The invention further provides a means for, when the wireless response tag 1 is used, detecting whether the picking confirmation key 24 and the operation completion key 25 are turned on, and informing the worker that the article picking operation, of which the worker is in is complete. This means can be utilized for providing a timing for holding finished/unfinished data in the memory of the terminal equipment 4. In the case of an on-line operation, the finished/unfinished data can be utilized for holding the operation management state in answer to the inquiries for confirming the operation state from the host computer.

Previously, the article shipment list and delivery list were printed and put into a receiving box prior to conveying the article on the belt conveyer. Then, the worker picked the article that corresponded to the list. This was because the work has heretofore been carried out at one place being restricted by the installation of the printing unit. According to this picking method, however, when the article is lacking, the shipment slip must be printed again unless the article is supplemented. According to a fourth embodiment of the invention, the shipment terminal reads the customer data, picking data, etc. from the wireless response tag of the receiving box when inspecting the shipment after the article has passed through the article shelf, and the printing unit prints the shipment request slip and the delivery slip, eliminating the need for printing the slips again thus contributing to a decrease in the amount of consumption of paper.

A fifth embodiment of the invention is to set the article in charge to the terminal of the article shelf. The conventional manual operation relies upon the memory of the worker. When the articles on the shelf are changed, therefore, miss operation often occurs due to misunderstanding. In using the bar code reader, when an ID is sent to the host computer, the article data in charge of the worker are sent from the host computer on-line and in real time, eliminating the need for setting the article. In the case when the on-line system becomes defective, even partly, however, the articles are missing and the system may stop.

In a system in which an article in charge of the article shelf is set to the terminal equipment using the wireless response tag 1, the article can be picked if the data of the receiving box are read out in an off-line manner and if there are article data that are set. The terminal equipment may have a function by which the article data can be set from the on-line function, as a matter of course. It is further possible to set the terminal number to the wireless response tag such that it cannot be set to terminal equipment other than the desired terminal equipment and the article data can be set to the terminal equipment with which the terminal number is in agreement. In setting the data in an off-line manner, a data carrier such as floppy disk, memory card, optical disk, etc. can be used instead of the wireless response tag.

According to a sixth embodiment of the invention, a timing is determined for when to return the receiving box into which the picked article has been put back onto the belt conveyer mechanically and automatically. Previously, when the receiving box on the belt conveyer is stopped by a stopper and is returned, the receiving boxes in front of the stopper are tied in a row and the arrival of the receiving box to be picked is delayed, adversely affecting the timing of picking. According to the present invention, communication is effected relative to one or a plurality of preceding terminal equipment and, when there exists an article to be picked at the preceding terminal equipment, the stoppers are operated nearly at the same time and the receiving box is mechanically and automatically returned back to the belt conveyer. This makes it possible to smooth the flow of receiving boxes on the belt conveyer and to shorten the stopping time.

According to a seventh embodiment of the invention, the timing is indicated for the worker to return the receiving box, into which the picked article has been put, back onto the belt conveyer relying upon visual data. According to this embodiment, one or a plurality of preceding terminal equipment confirm the contents of the wireless response tag 1 and, when there exists an article to be picked at the preceding terminal equipment, the position or the presence of the receiving box is indicated by means of a lamp or the like. This makes it possible to shorten the time for halting the receiving box on the belt conveyer and to let the worker know the timing for returning the receiving box back onto the belt conveyer.

The first through fourth embodiments will now be described briefly.

In the operation for picking an article on the article shelf by conveying a receiving box using a belt conveyer, provision is made of a means for imparting an independent picking management number to each of the terminal equipment or to each group of a plurality of terminal equipment that control the article shelves. A wireless response tag having a rewritable storage unit is attached to the receiving box that moves on the belt conveyer and a destination-of-picking read terminal at a position of the belt conveyer in front of the article shelf reads the picking data so that a sufficient period of time is provided for picking the article. At this moment, the destination-of-picking read terminal sends to the corresponding article shelf (which may often be in a plural number) the picking article data such as article number, quantity, etc. and the picking management data in combination through a cable connected thereto.

The terminal equipment 4 that corresponds to picking the article displays the picking management number on the prepicking shelf and displays a picking number of the quantity display of the corresponding article shelf. Upon detecting the turn-on of the picking key that is depressed when the article is picked and the turn-on of the operation completion key, the data related to the completion of picking/lack of article are stored in the memory of the terminal equipment 4. This means that the worker has picked the article relying upon the data transmitted from the destination-of-picking read terminal and has placed it at the corresponding number on the prepicking shelf.

When the receiving box has approached the terminal equipment that controls the article shelf, the terminal equipment reads the picking management data and produces a display on the display connected to the terminal equipment or flashes the indicator or turns on a lamp of the prepicking shelf. Next, the turn-on of the operation completion key of the prepicking shelf is detected, and the picking data are written into the wireless response tag for each of the articles. This means that the worker has taken out the article from the prepicking shelf indicated by the indicator, the operation completion key is depressed and the article is put into the receiving box. The picking data for each of the articles can be utilized as the data related to the operation management state in answer to the inquiries related to confirming the operation state. When the receiving box has arrived at a place of shipment, the shipment terminal reads the result of picking, customer and picking data from the wireless response tag of the receiving box, and the printer unit that is connected prints the transport slip, delivery slip and a notice of lacking article in case the article is lacking.

The fifth embodiment will be described in further detail.

The data related to the shelf position of an article are controlled by the host computer, and the article data of shelves that are controlled are set to the terminal equipment through the communication cable. In this case, the terminal equipment is capable of reading the data from the wireless response tag. To cope with troubles in the communication cable, therefore, the wireless response tag is utilized to transmit to the terminal equipment the article data of a shelf that is controlled. Here, in order to distinguish the terminal equipment from other ones, independent terminal numbers are imparted to the terminal equipment and the data of a wireless response tag with which the terminal number is in agreement are set thereto. Moreover, a set time or a set flag of the terminal equipment is recorded in the wireless response tag.

The sixth and seventh embodiments are described below.

When the receiving box containing the picked article is to be returned back onto the belt conveyer by the insertion device, the plurality of terminal equipment have been connected to the network and the terminal equipment having the receiving box for which the picking operation has been completed makes an inquiry to the preceding terminal equipment whether they have an article to be picked for that terminal equipment. When there is a response from the preceding terminal equipment that they do not have a receiving box for picking the article, the terminal equipment actuates the stopper, e.g., upwardly raises a stop bar from the lower side of the belt conveyer, temporarily stops the receiving box, and creates a space for returning the receiving box for which the picking operation has been done back onto the belt conveyer. Thereafter, the insertion device is instructed to operate, and the receiving box that has completed the operation is returned back onto the belt conveyer.

In the invention of the seventh embodiment, in particular, lamps are used to indicate that the box for picking is approaching the preceding one or a plurality of terminal equipment, and the worker can see the timing for returning the box onto the belt conveyer.

The invention will now be described in detail in conjunction with the drawings.

FIG. 1 is a diagram illustrating the constitution of a system for writing picking data into the tag according to the present invention, i.e., shows the system for writing order as picking data into the wireless response tag, wherein reference numeral 5 denotes an order-accepting unit where an order of a customer over the telephone is accepted through a keyboard (see FIG. 3) or an order by a slip is read by an optical recognizing unit and shipment data are handed over to an order file 27 in a host computer 6. The host computer 6 regularly or irregularly outputs shipment data to a terminal equipment 4 which writes shipment data from the host computer into a wireless response tag 1 attached to a receiving box 2. The content of the wireless response tag includes the name of a customer, address, name of the article ordered, number, shelf position, box size, etc. There are more than ten kinds of standardized receiving boxes 2 that are constituted by using corrugated cardboard boxes or plastic cases.

Figure 2:
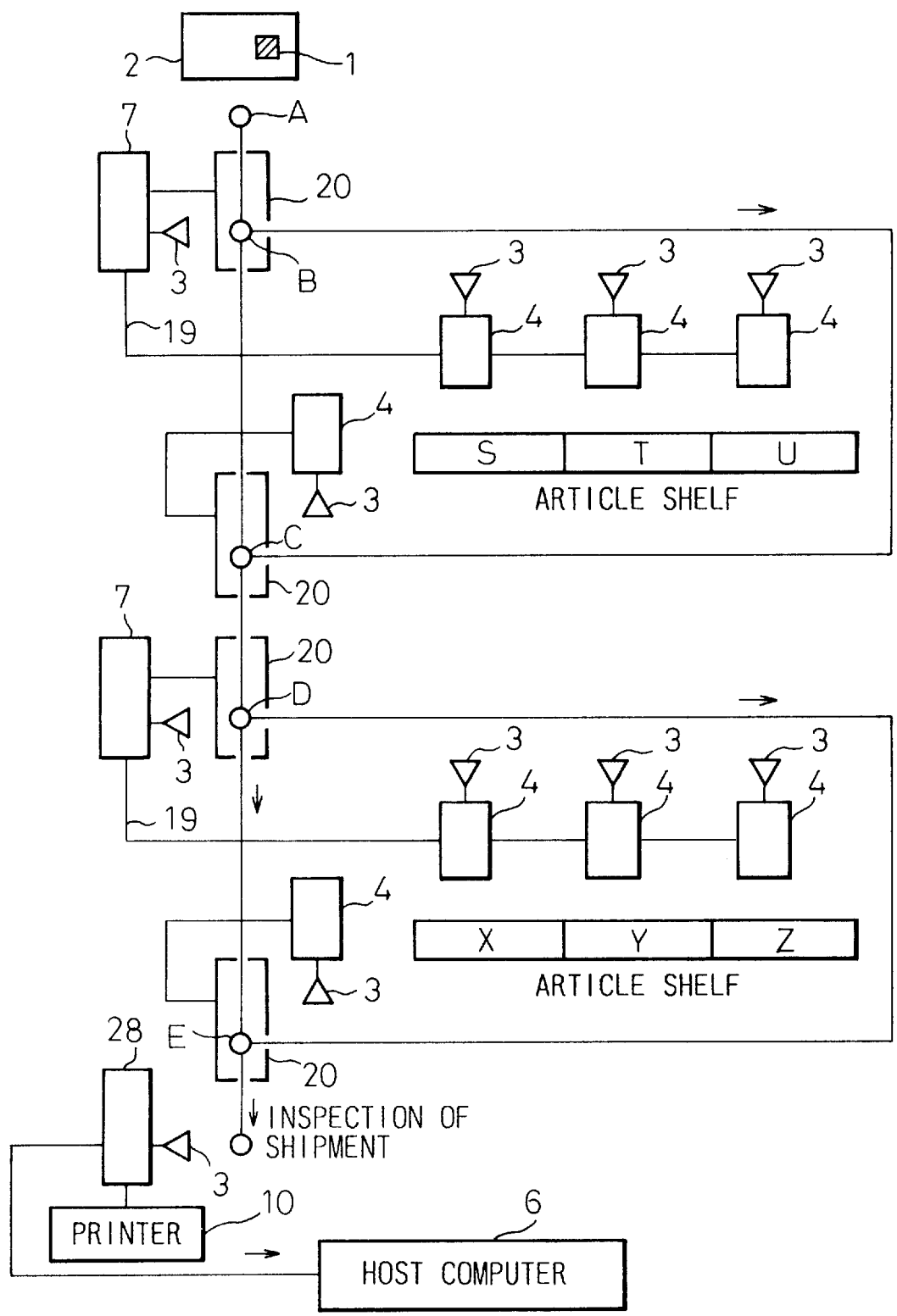
FIG. 2 is a diagram illustrating the basic constitution of a picking system according to the present invention.

FIG. 2 is a diagram illustrating the basic constitution of a picking apparatus according to the present invention. The receiving box 2 having the wireless response tag 1 recording the picking data as shown in FIG. 1 moves on the belt conveyer starting from a point A. At a branching point B, the terminal equipment 4 is on-line connected to the terminal equipment 4 of the article shelves S, T and U through a cable 19 to retrieve picking data of the article shelves S, T and U. At the same time, when there is an article to be picked, its own picking number (independent sequence number for each of the article shelves S, T and U, or a sequence number imparted to a group of the article shelves S, T and U) is written into the wireless response tag at the branching point B, which is well ahead of the article shelves, and the sequence number and the picking data are transferred to the terminal equipment 4 located close to the shelves S, T and U. Here, the position well ahead stands for a position at which the receiving box has passed by more than a period of time required for the picking operation. Concretely speaking, this position is expressed as follows:

Position well ahead ≧ picking time for an article
× picking number
× conveying speed of the belt Here, if the picking time for an article is 6 seconds, the picking number is three in average, and the conveying speed of the belt conveyer is about 50 cm a second, then the position is nine meters ahead of the shelf.

When the position cannot be maintained well ahead, the number of articles to be picked should be decreased. In inspecting the shipment, the shipment terminal equipment 28 reads the shipment data as well as data related to lacking articles from the wireless response tag 1 attached to the receiving box 2, and a printer unit 10 that is connected prints the address, name, telephone number, etc. of a customer on the transport slip and on the delivery slip. When the article to be sent is lacking, a notice of lacking article is printed and is packaged together with the article in a corrugated cardboard box for transportation. Symbols C, D and E also denote branching points. The above description applies to the branching point D and to the article shelves X, Y and Z.

The shipment inspection terminal reads the wireless response tag data and informs the host computer 6 of the completion of operation, or transmits the result of processing for an inquiry from the host computer.

Figure 3:
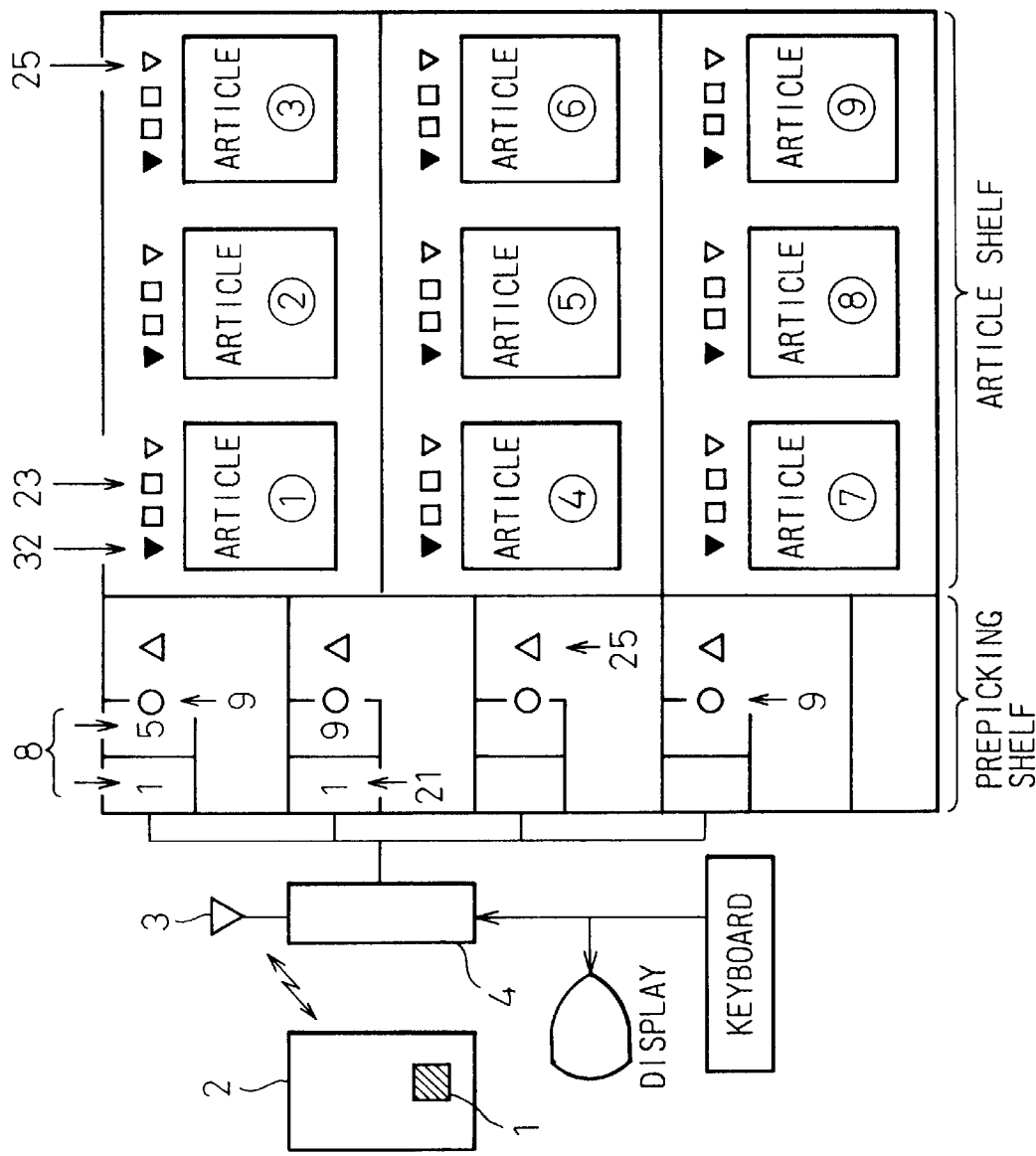
FIG. 3 is a diagram illustrating the constitution of an article shelf system.

FIG. 3 is a diagram illustrating the constitution of an article shelf system, wherein reference numeral 9 denotes lamps, 21 denotes management number indicators, 23 denotes quantity indicators, 25 denotes operation completion keys, and reference numeral 32 denotes lacking-article keys. As the receiving box having the wireless response tag 1 recording the picking management number approaches the article shelf for which the picking operation is to be executed, the terminal equipment 4 reads the picking management number from the wireless response tag 1, flashes the picking management number at the prepicking shelf or causes the display to indicate the picking management number, in order to give to the worker an instruction for putting the article into the receiving box. After the terminal equipment has detected the picking key, lacking-article key and operation completion key that have all been turned on, the picking management number is erased upon an instruction from the terminal equipment. A particular code is recorded that can be distinguished from the character code so that the extinction can be confirmed. The picking confirmation key and the lacking-article key are arranged maintaining a distance from each other to prevent erroneous operation.

Figure 4:
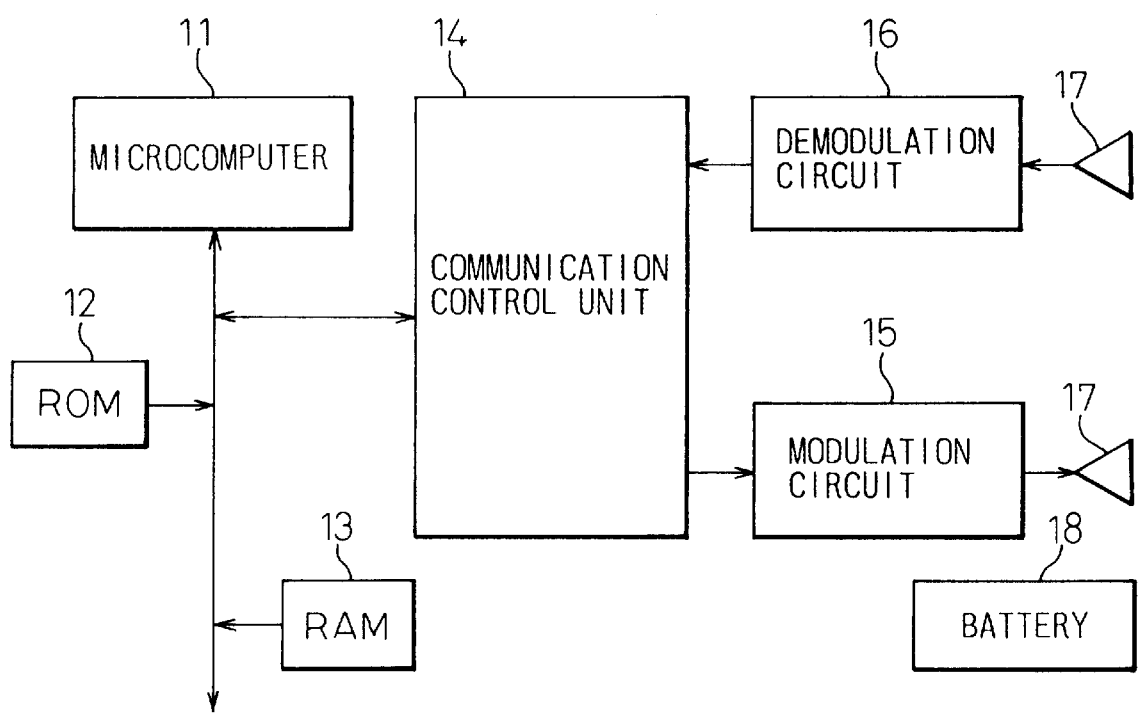
FIG. 4 is a diagram illustrating the constitution of a wireless response tag according to the present invention.

FIG. 4 is a diagram illustrating the constitution of the wireless response tag according to the present invention. The wireless response tag has an internal structure as described below. That is, a microprocessor 11 reads a program stored in a ROM 12 and executes it, so that the picking data are all recorded in a RAM (SRAM). In transmitting the signals, a communication control unit 14 converts parallel signals into serial signals and sends them to a modulation circuit 15. In receiving the signals, the communication control unit 14 converts the serial signals sent from a demodulation circuit 16 into parallel signals, and hands them over to the microprocessor 11.

An antenna 17 transmits and receives data to and from an antenna 3 connected to the terminal equipment 4. The modulation circuit 15 modulates the data into a predetermined form when the data are to be transmitted from the wireless response tag 1. The demodulation circuit 16 works to take out predetermined data from the received data. A cell 18 supplies electric power to each of the units in the wireless response tag. A plurality of picking management numbers 8 (see FIG. 3) are set to the RAM 3. This enables the destination-of-picking terminal to control a plurality of article shelves.

Figure 5:
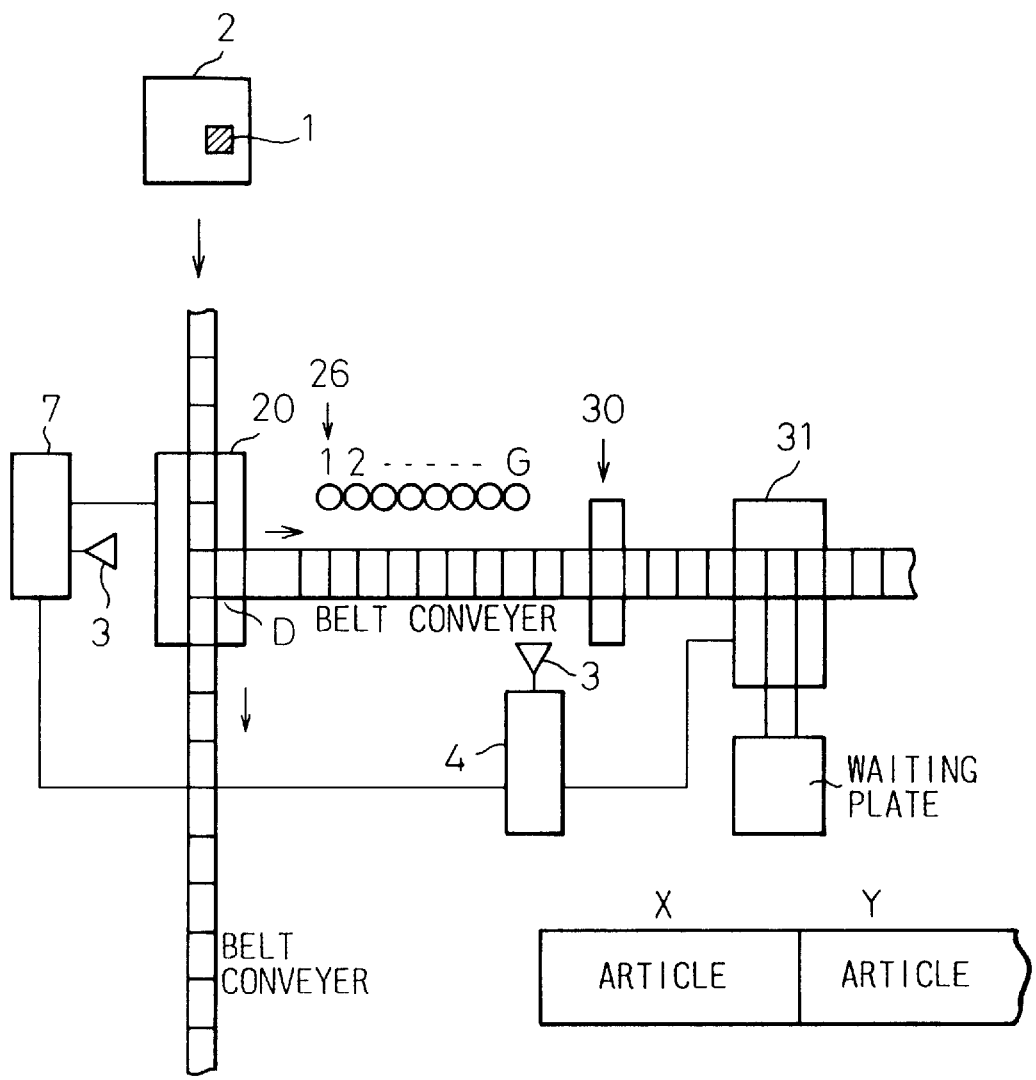
FIG. 5 is a diagram illustrating the constitution of a conveyer system according to the present invention.

FIG. 5 is a diagram illustrating the constitution of a conveyer system. The destination-of-picking read terminal equipment 7 reads, from an article near the branching point D, the shelf data and article data stored in the wireless response tag 1 of the receiving box 2, judges whether the article should be branched to the direction of the shelf X and instructs a direction-changing unit 20 to change the direction of movement. The direction-changing unit 20 works to change the direction of movement of the receiving box. Lamps B (26) are turned on and off being controlled by the destination-of-picking read terminal equipment 7 such that the turn-on position moves nearly at the same speed as the receiving box. A stopper 30 is constructed as described below. That is, the terminal equipment 4 confirms whether there is a receiving box 2 for picking the article at the destination-of-picking read terminal equipment 7. When there is no such a receiving box 2, a stop bar is lifted up by the terminal equipment 4 from the lower side of the belt conveyer to create space for returning the receiving box onto the belt conveyer. This is done while the stopper is being lifted up for several seconds. The insertion device 31 is controlled by the terminal equipment 4 and works to put the receiving box on the insertion-waiting plate onto the belt conveyer after the stopper is operated.

Figure 6:
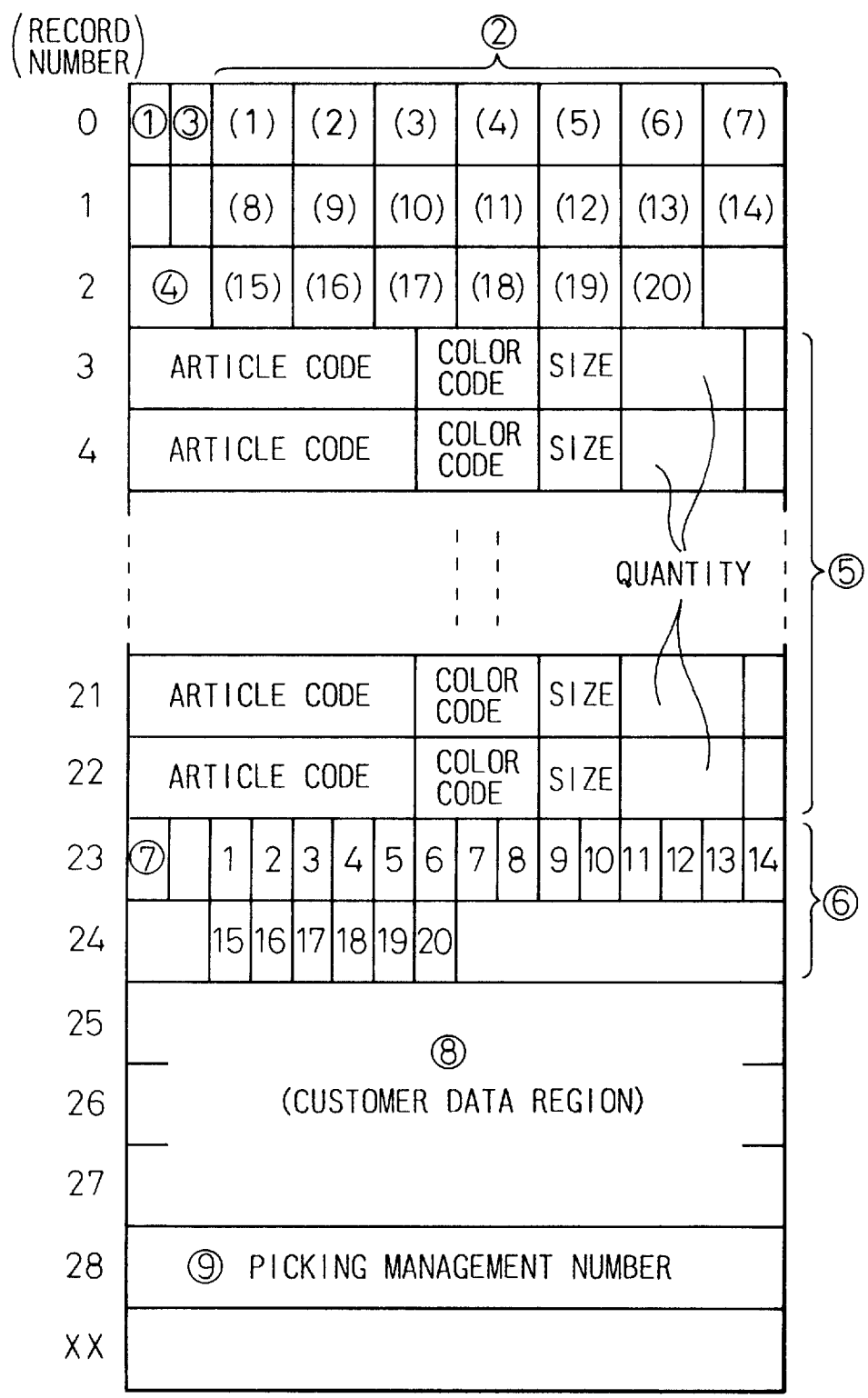
FIG. 6 is a diagram illustrating an example of the constitution of a data management table in the wireless response tag of the present invention.

FIG. 6 is a diagram illustrating the constitution of a data management table in the wireless response tag, wherein reference numeral 1 in a circle denotes a process function code (1 byte) for designating a processing executed by a terminal, 2 in a circle denotes a terminal identification number of a terminal that is controlling a shelf on which is stored the ordered article, 3 denotes a number-of-order discrimination code I (1 byte) for checking the number of orders, 4 denotes a conveyance sorting code (2 bytes) used for sorting the articles depending upon the areas after they have been picked, 5 denotes an order data region for storing the order data necessary for the picking, 6 denotes an operation result region for storing the results of picking operation for each of the order data, 7 denotes a number-of-order discrimination code II for checking the number of orders, 8 denotes a customer data region for storing the customer number, date of order made by a customer, etc., and reference numeral 9 in a circle denotes a picking management number.

FIG. 7 is a diagram illustrating a terminal setting management in the wireless response tag. A terminal number (4 bytes) indicates the number of a terminal equipment for setting the article data, and is specific to the system. A shelf number (8 bytes) indicates the number of a shelf controlled by a terminal, and is specific to the system. A host recording date (4 bytes) indicates the date on which the host computer has issued a setting instruction to the terminal equipment. A terminal reception date/hour (5 bytes) indicates the date and hour of when the terminal equipment has received the setting data from the wireless response tag. The host recording date and the terminal reception date/hour can be utilized as data enabling the host computer to know the receiving state of the terminal equipment. The article code (8 bytes) is constituted by a color code (3 bytes) and a size (2 bytes). Therefore, the lengths of the record numbers are each 16 bytes.

Figure 8A:
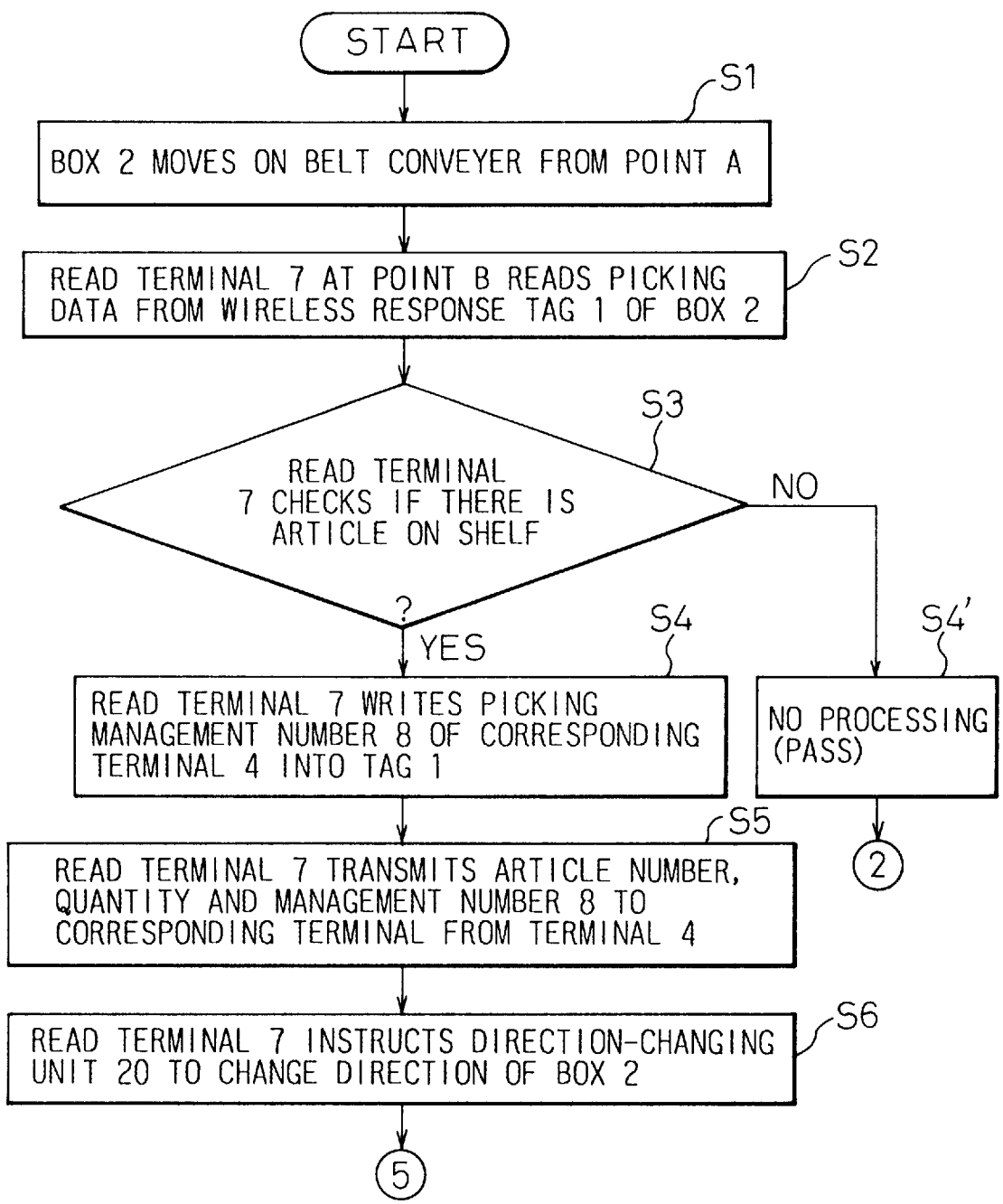
FIGS. 8A and 8B are flow charts (No. 1) for controlling the picking system of FIG. 2.
Figure 8B:
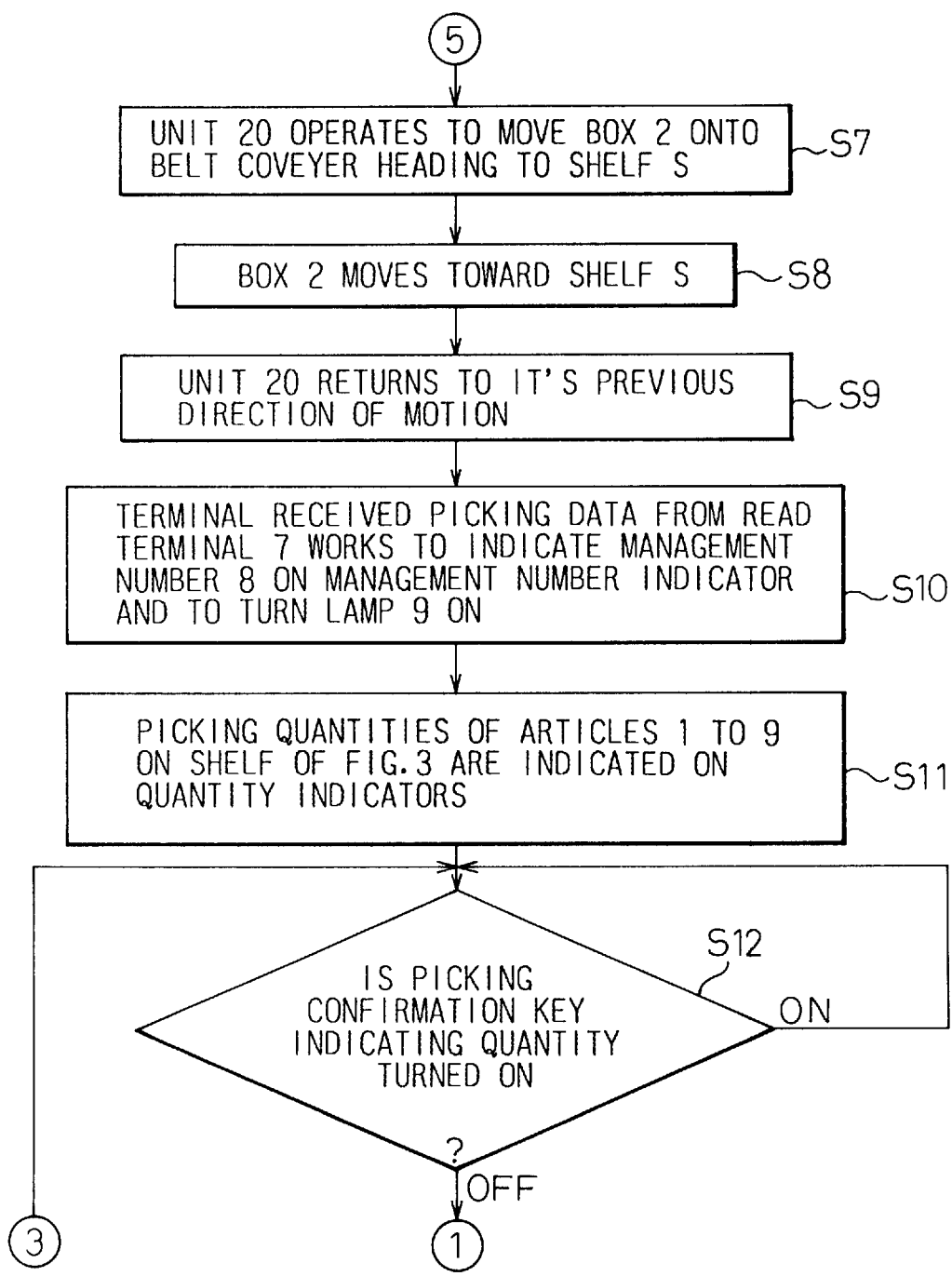

FIG. 8 is a flow chart for controlling the picking apparatus shown in FIG. 2. Though the processing of FIG. 2 was basically described in the foregoing, it will be described here again with reference to the flow chart of FIG. 8. The receiving box 2 moves on the belt conveyer starting from the point A (S1). The destination-of-picking read terminal 7 at the branching point B reads the picking data from the wireless response tag 1 of the receiving box 2 (S2). The destination-of-picking read terminal 7 checks whether the subject article exists on the article shelves S, T and U (S3). When it exists, the destination-of-picking read terminal 7 writes the picking management number 8 of the corresponding terminal 4 into the wireless response tag 1 (S4). When it does not exist, no processing is executed (S4').

The destination-of-picking read terminal 7 transmits the article number, quantity and picking management number 8 to the corresponding terminal 4 from the terminal 4 that is controlling the shelves S, T and U (S5). The destination-of-picking read terminal 7 instructs the direction-changing unit 20 of the belt conveyer to change the direction of the receiving box 2 (S6). The direction-changing unit 20 of the belt conveyer operates to move the receiving box 2 onto the belt conveyer heading to the shelf S (S7). The direction-changing unit 20 of the belt conveyer returns to its previous direction of motion (S9). The terminal that has received the picking data from the destination-of-picking read terminal 7 works to indicate the picking management number 8 on the management number indicator and to turn the lamp 9 on (S10). Picking quantities are indicated on the quantity indicators for articles 1 to 9 on the article shelf of FIG. 3 (S11). It is judged whether the picking confirmation key that has indicated the quantity is turned on (S12).

Figure 9A:
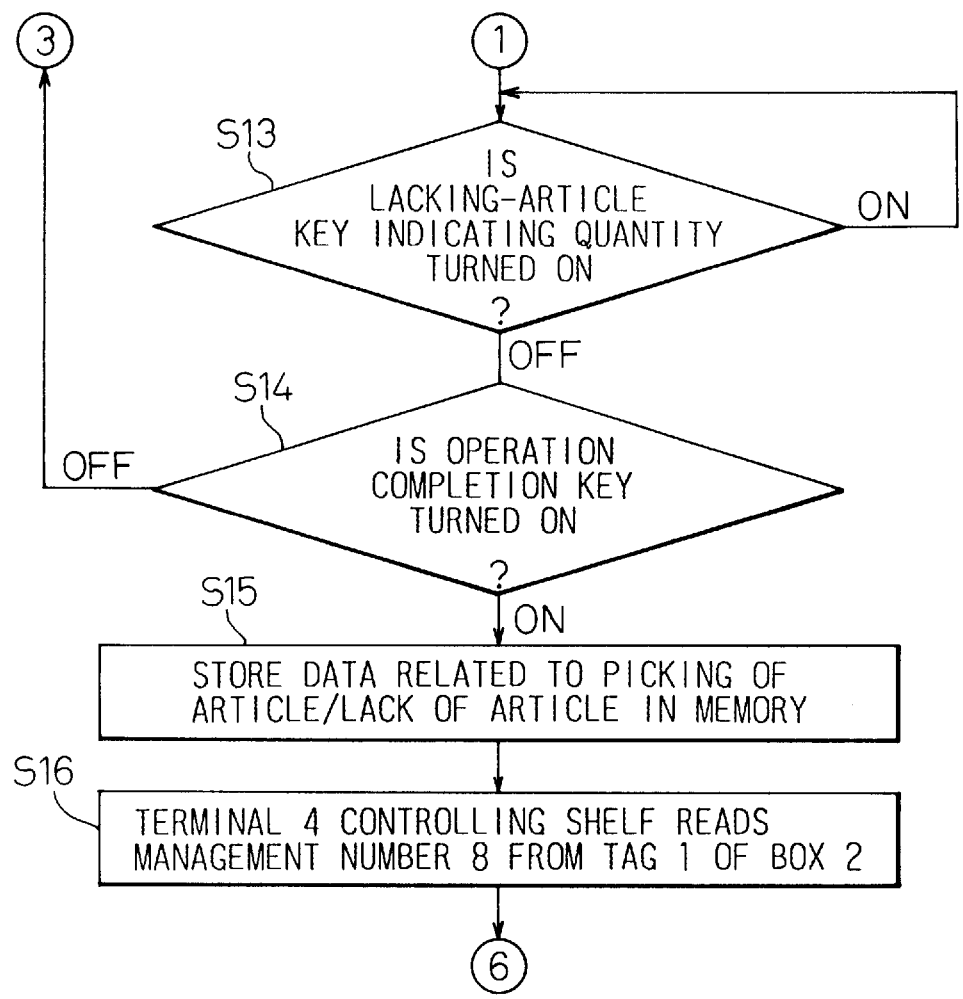
FIGS. 9A and 9B are flow charts (No. 2) for controlling the picking system of FIG. 2.
Figure 9B:
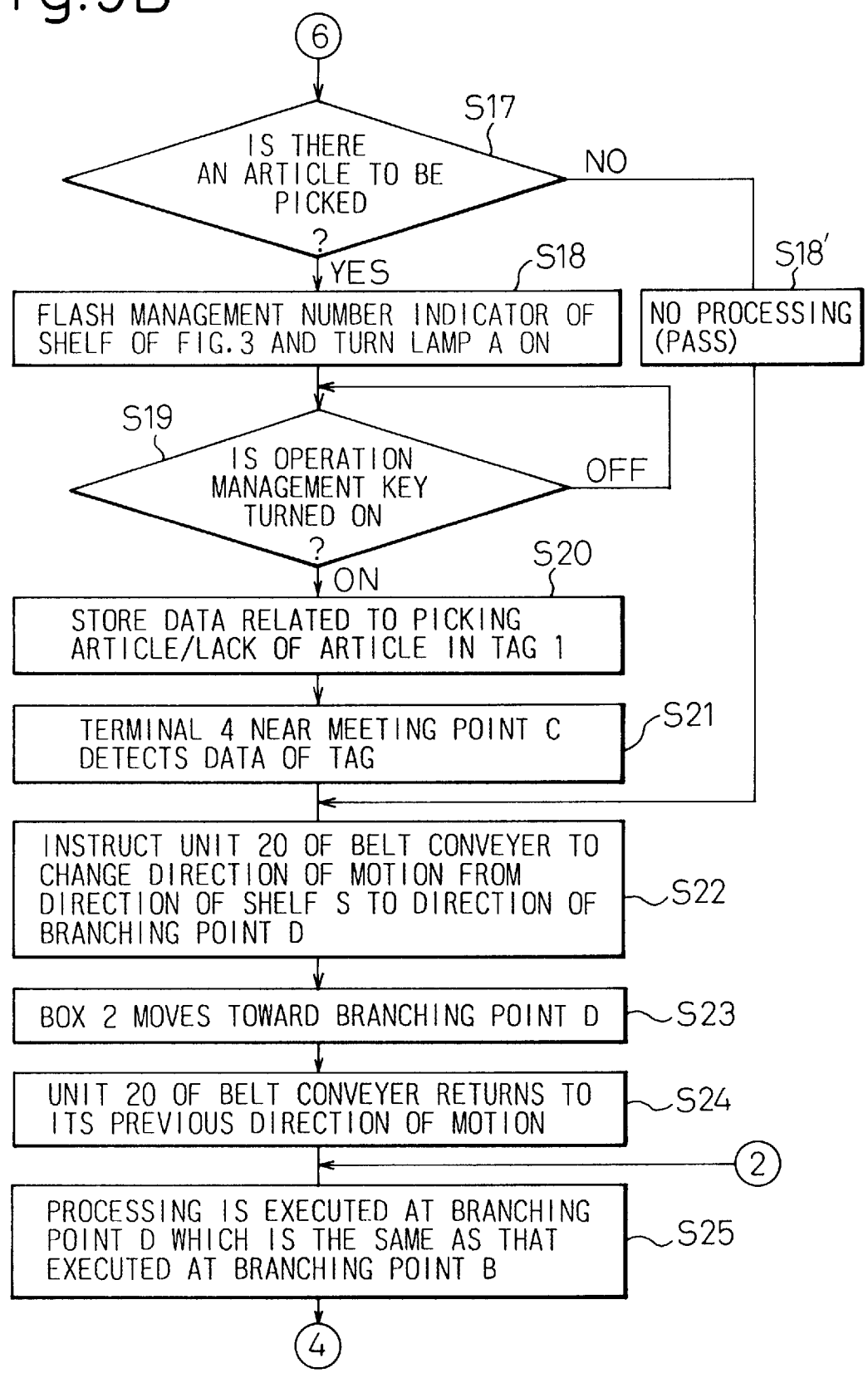

Referring to FIG. 9, when the picking confirmation key is turned off, it is judged whether the lacking-article key that has indicated the quantity is turned on or not (S13). It is also judged whether the corresponding operation completion key is turned on (S14). The data related to picking the article/ lack of article are stored in the memory of the terminal equipment 4 (S15). The terminal 4 that controls the shelf S reads the management number from the wireless response tag 1 of the receiving box 2 (S16). It is then judged whether there is an article to be picked (S17). When there is an article to be picked, the management number indicator of the article shelf system of FIG. 3 is flashed (S18). It is judged whether the operation management key is turned on (S19). The data related to picking the article/lack of article are stored in the wireless response tag 1 (S20). The terminal 4 near the meeting point C then detects the data of the tag (S21). The direction-changing unit 20 of the belt conveyer is then instructed to change the direction of motion from the direction of the shelf S toward the direction of the branching point D (S22). The receiving box 2 moves toward the direction of the branching point D (S23). The direction changing unit 20 of the belt conveyer then returns to its previous direction of motion (S24). The processing is executed at the branching point D which is the same as that executed at the branching point B (S25).

Figure 10:
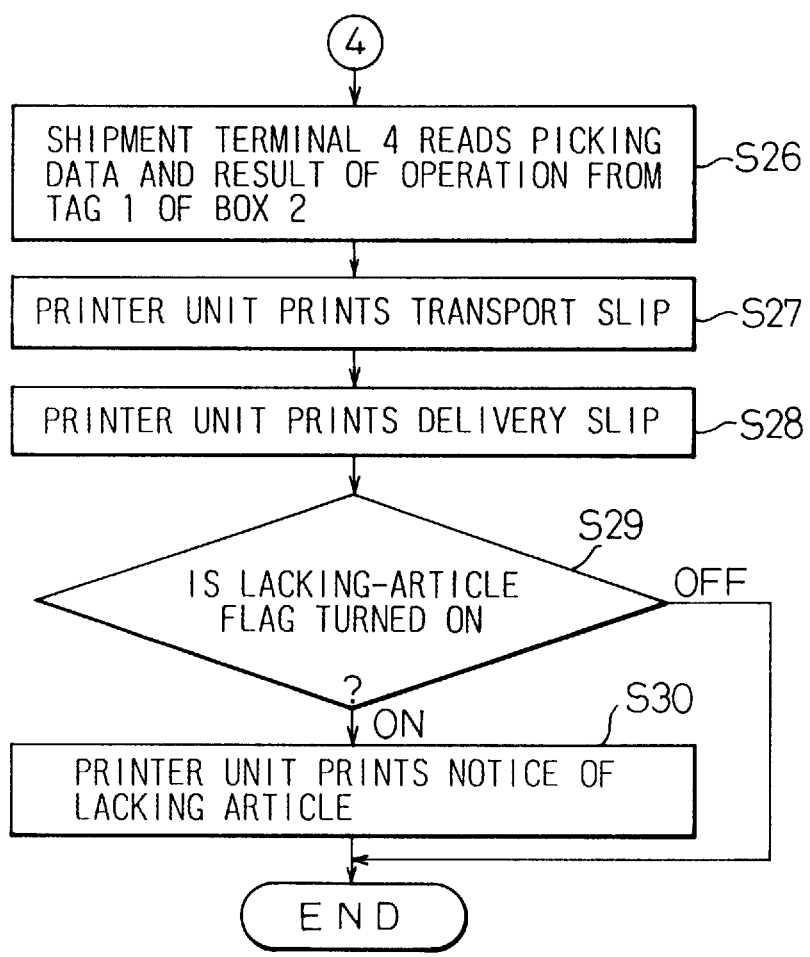
FIG. 10 is a flow chart (No. 3) for controlling the picking system of FIG. 2.

Referring to FIG. 10, the shipment terminal 4 reads the name of a customer, address, article number, result of operation, etc. from the wireless response tag of the receiving box 2 (S26). The printer unit then prints a transport slip (S27). The printer unit also prints a delivery slip (S28). It is then judged whether the lacking-article flag is on or not (S29). If the lacking-article flag is on the printer unit prints a notice of lacking article (S30).

Figure 11:
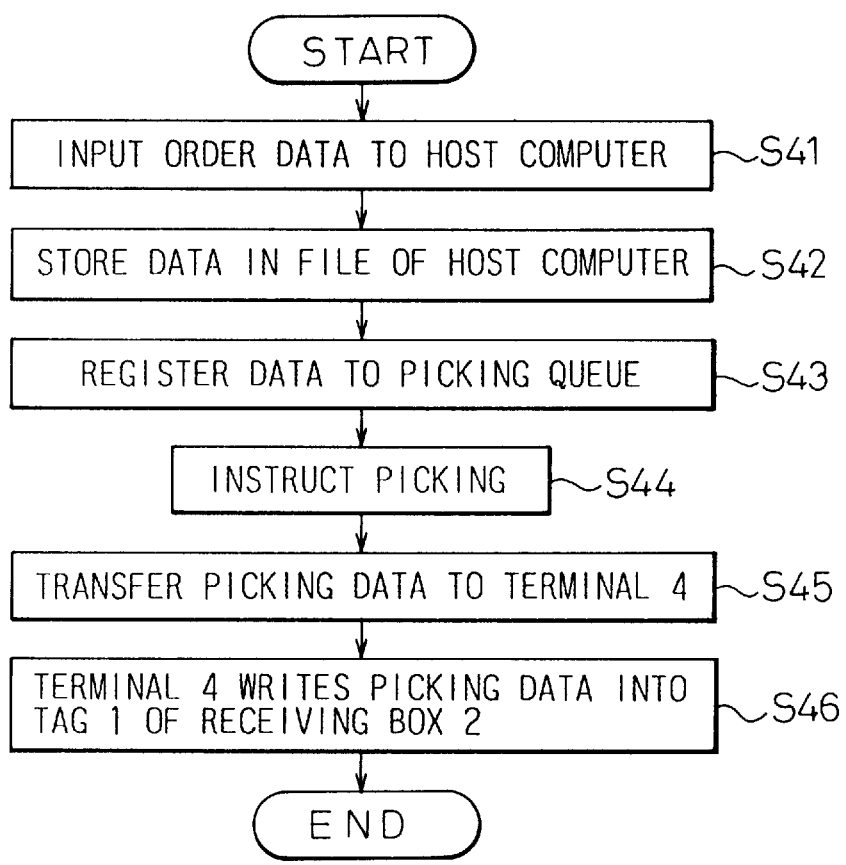
FIG. 11 is a flow chart illustrating a method of processing picking data using the wireless response tag of FIG. 4.

FIG. 11 is a flow chart illustrating a method of processing the picking data using the wireless response tag shown in FIG. 4. The order data such as the name of a customer, address, article number and quantity are input to the host computer (S41). The data are then stored in the file of the host computer (S42) and registered to a picking queue (S43). A picking instruction is then issued (S44). The picking data are transferred to the terminal 4 (S45). The terminal 4 then writes picking data into the wireless response tag of the receiving box (S46).

Figure 12:
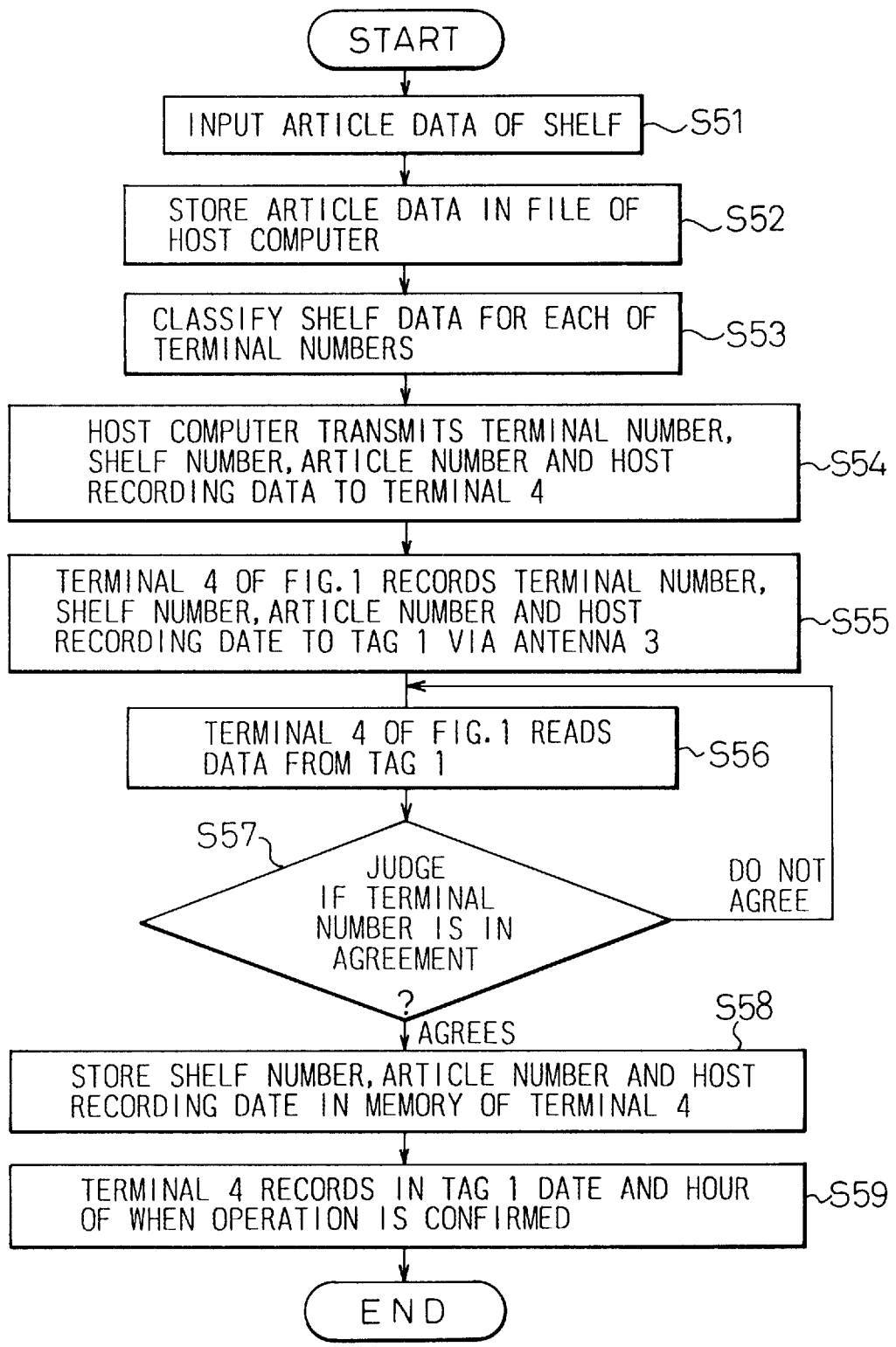
FIG. 12 is a flow chart for setting article data and shelf data to the terminal equipment using the wireless response tag.

FIG. 12 is a flow chart for setting the article data and shelf data to the terminal equipment using the wireless response tag. First, article data of the shelf such as article number, shelf number and terminal number are input (S51). The data are stored in the file of the host computer (S52). The shelf data are classified for each of the terminal numbers (S53). The host computer of FIG. 1 transmits the terminal number, shelf number, article number and host recording date to the terminal 4 (S54). The terminal equipment 4 of FIG. 1 then records the terminal number, shelf number, article number and host recording date into the wireless response tag 1 through the antenna 3 (S55). The terminal equipment 4 of FIG. 2 then reads the data from the wireless response tag 1 (S56). It is then judged whether the number of the terminal equipment is in agreement (S57). The shelf number, article number and host recording date are stored in the memory of the terminal equipment 4 when the number of the terminal equipment is in agreement (S58). Finally, the terminal equipment 4 records the date and hour of when the operation is confirmed into the wireless response tag 1 (S59).

FIG. 13 is a flow chart of when the receiving box is returned back onto the belt conveyer in the conveyer system shown in FIG. 5. The data are read from the wireless response tag of the moving receiving box (S61). When the data read from the wireless response tag 1 includes the article to be picked that is controlled by the terminal, the picking management number is registered to the operation queue of the terminal (S62). It is then judged whether the operation completion key is turned on (S63). When it is turned on, the terminal inquires, through the network 19, from the preceding terminal whether there exists a receiving box to be picked (S64). A response is then received from the preceding terminal (S65). It is judged whether there is a box to be picked (S66) and an operation instruction is sent to the stopper S (S67). An operation instruction is then sent to the insertion device (S68). The terminal equipment 4 erases the picking management number for which the operation is completed from the queue (S69).

Figure 14A:
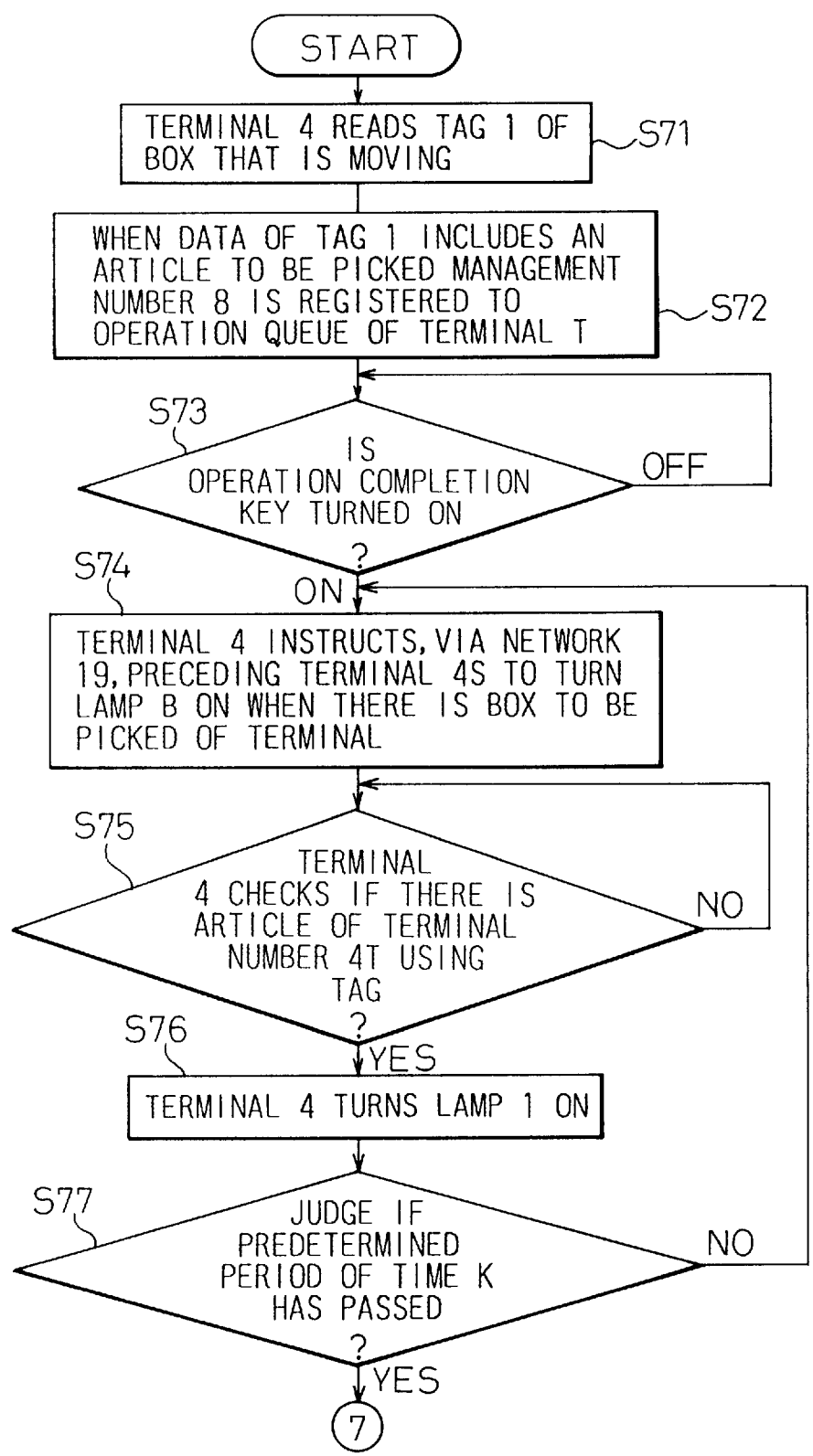
FIGS. 14A and 14B are flow charts of when the receiving box on the belt conveyer is indicated by using lamps.
Figure 14B:
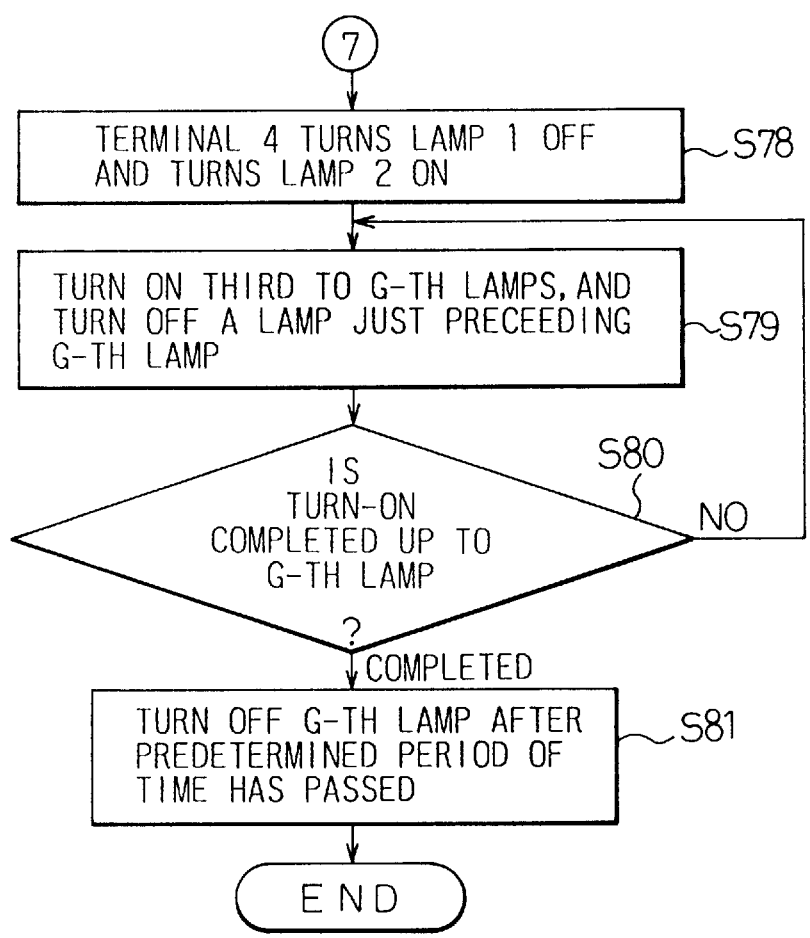

FIGS. 14A and 14B are flow charts of when the receiving box is indicated on the belt conveyer by using lamps. The terminal T reads the data from the wireless response tag of the receiving box that is moving (S71). When the data read from the wireless response tag includes an article to be picked that is controlled by the terminal T, the picking management number is registered to the operation queue of the terminal T (S72). It is then judged whether the operation completion key is turned on (S73). When it is turned on, the terminal T instructs, through the network 19, the preceding terminal S to turn the lamp B on when there is the receiving box to be picked of the terminal T (S74). The terminal S checks whether there is the article of the terminal number T by using the wireless response tag (S75). When there is the article, the terminal S turns the lamp on (S76). It is judged whether a predetermined period of time K has elapsed (S77). When this time has elapsed, the terminal S turns the lamp 1 off and turns the lamp 2 on (S78). The third to G-th lamps are turned on, and a lamp that just precedes the G-th lamp is turned off (S79). It is judged if the turn-on of the lamps is completed up to the G-th lamp (S80). When the turn-on has been completed, the G-th lamp is turned off after the passage of the predetermined period of time K (S81). In the steps S76 to S81, the worker learns a timing for returning the receiving box back onto the belt conveyer while the lamp is turned off.

According to the present invention as described above, the picking data are read out prior to picking the article and the article is then picked in advance, making it possible to even out the amount of work for the worker. By utilizing the picking management data, furthermore, the communication time relative to the wireless response tag can be shortened. That is, there is no need to read out all of the article list from the wireless response tag. According to the present invention, furthermore, when the amount of work is decreased due to seasonal changes and other changes, the picking management number can be set to each of the terminals or to a group of a plurality of terminals, making it possible to efficiently arrange the workers. Moreover, the present invention requires neither the time for holding a paper that was used when a paper list was checked nor the access time to the host computer, making it possible to shorten the processing time.

According to the present invention, furthermore, the transport slip, delivery list and, depending upon the case, lacking articles and errors can be printed by using the wireless response tag at the time of shipping the articles, without causing the slips to be fouled. In particular, when the article is lacking, the printing is effected only once contributing to decreasing the amount of consumption of paper. Moreover, when the article data and shelf data are instructed by the host computer, the article data and shelf data are written into the wireless response tag from the host computer even in the case when the on-line network becomes defective, and the article data can be set by hand to the terminal equipment near the corresponding shelf. According to the present invention, after the article has been picked and when the receiving box is to be returned back onto the belt conveyer, the receiving box for which the picking operation is done is automatically returned back in synchronism with the halting of the receiving box for which the picking operation is to be effected relying upon the confirmation by the preceding terminals. This makes it possible to shorten the time in which the receiving boxes remain halted on the belt conveyer and to carry out the operation automatically.

According to the present invention, furthermore, when the receiving box for which the picking operation is done is to be automatically and mechanically returned back onto the belt conveyer, the preceding terminals confirm the presence of the article that is to be picked and lets the worker know the timing for returning the receiving box back onto the belt conveyer.

We claim:

1. A system to pick articles, comprising:

a wireless response tag having a rewritable storage unit;

a receiving box to hold said wireless response tag and to store a desired article;

an antenna to communicate with said wireless response tag;

terminal equipment for writing and reading article data to and from said wireless response tag via said antenna;

a plurality of article shelves to store a plurality of articles;

a plurality of display units disposed in the vicinity of each of said plurality of article shelves; and a belt conveyer to convey said receiving box to pick one of said plurality of articles by using said receiving box, wherein provision is made for a destination-of-picking read terminal at a position of said belt conveyer in front of said plurality of article shelves to read article data picked from said wireless response tag, to display the corresponding article and a picking management number on said display unit and to store said picking management number in said wireless response tag, and said terminal equipment reads the picking management number when said receiving box has moved close to said plurality of article shelves and displays the picking management number on said display unit by using said antenna disposed near said belt conveyer in the vicinity of each of said plurality of article shelves.

2. A system to pick articles according to claim 1, wherein the picking management number is set to said destination-of-picking read terminal for each of said terminal equipment or for a group of said terminal equipment.

3. A system to pick articles according to claim 1, wherein said terminal equipment writes data related to lacking articles into said wireless response tag.

4. A system to pick articles according to claim 1, further comprising:

shipment terminal equipment; and a printer unit, wherein said shipment terminal equipment reads out customer and picking data of said receiving box, which has passed through at least one of said plurality of said article shelves, from said wireless response tag and prints out the customer and picking data on a transport slip and a delivery slip.

5. A system to pick articles according to claim 1, wherein a terminal number and the article data of an article to be picked off of one of said plurality of article shelves are recorded into said wireless response tag, and the article data are set by using said wireless response tag when said terminal number is in agreement with said terminal equipment near one of said plurality of article shelves.

6. A system to pick articles according to claim 1, further comprising:

a stopper included with said belt conveyer to stop said receiving box;

an instruction signal to indicate that said receiving box is absent from a preceding terminal equipment or from a plurality of preceding terminal equipment at a time corresponding to a time when said receiving box is to be returned to said belt conveyer; and an insertion device to automatically return said receiving box to said belt conveyer when said instruction signal is sent to said insertion device.

7. A system to pick articles according to claim 1, further comprising:

a constitution having a plurality of terminals and corresponding lamps arranged along said belt conveyer, wherein a preceding terminal indicates to a succeeding terminal a position at which said receiving box to be picked is located by turning the lamp corresponding to the succeeding terminal on.

8. A system to pick articles from article shelves, comprising:

a first communication device having a rewritable storage unit;

a second communication device to communicate with said first communication device;

terminal equipment for writing and reading article data of articles to be picked to and from said first communication device via said second communication device; and a transporting device to transport said first communication device and said articles to be picked, wherein provision is made for a destination-of-picking read terminal at a position of said transporting device in front of said article shelves to read article data from said first communication device, to display the corresponding article to be picked and a picking management number and to store said picking management number in said first communication device, and said terminal equipment reads the picking management number when said first communication device has moved close to said article shelves and displays the picking management number by using said second communication device disposed near said transporting device in the vicinity of each of said article shelves.

* * * * *

UNITED STATES PATENT AND TRADEMARK OFFICE
CERTIFICATE OF CORRECTION

PATENT NO. : 5,875,434
DATED : February 23, 1999
INVENTOR(S) : Kazuo Matsuoka, et. al.

It is certified that error appears in the above-identified patent and that said Letters Patent is hereby corrected as shown below:

On the title page, first column, [56] References Cited, delete "0 284 466A1 9/1988 European Pt. Off.".

On the title page, second column, [56] References Cited, delete "Patent Abstracts of Japan, vol. 015, No. 164, Apr. 24, 1991 & JPA 03 0322241 (Honda Motor Co. Ltd) 13, Feb. 1991."

On the title page, [57] Abstract, line 11, change "from" to --front--.

Col. 2,      line 32, begin a new paragraph with "In".

Col. 3,      line 66, after "may" insert --be--.

Col. 4,      line 17, after "in" insert --charge--;
             line 64, after "carrier" insert --,--;
             line 67, after "box" insert --,--.

Col. 5,      line 1, after "put" insert --,--.

Col. 9,      line 67, after "is (second occurrence) insert --then--.

Signed and Sealed this

Twenty-first Day of September, 1999

Attest:

Q. TODD DICKINSON

Attesting Officer     Acting Commissioner of Patents and Trademarks